United States Patent
Akiyama

(10) Patent No.: US 7,062,089 B2
(45) Date of Patent: Jun. 13, 2006

(54) HANDWRITTEN CHARACTER INPUT ASSISTANT APPARATUS AND METHOD

(75) Inventor: Katsuhiko Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 644 days.

(21) Appl. No.: 10/299,817

(22) Filed: Nov. 20, 2002

(65) Prior Publication Data
US 2003/0161532 A1 Aug. 28, 2003

(30) Foreign Application Priority Data
Feb. 22, 2002 (JP) .............................. 2002-046504

(51) Int. Cl.
*G06K 9/00* (2006.01)
(52) U.S. Cl. ...................... 382/187; 382/181; 382/182; 382/183; 382/184; 715/541
(58) Field of Classification Search .................... None
See application file for complete search history.

(56) References Cited

U.S. PATENT DOCUMENTS 5,535,287 A * 7/1996 Niki ........................... 382/178
6,493,736 B1 * 12/2002 Forcier ....................... 715/541

FOREIGN PATENT DOCUMENTS

JP 5-67237 3/1993
JP 6-51900 2/1994

* cited by examiner

*Primary Examiner*—Mark Zimmerman
*Assistant Examiner*—Alex Liew
(74) *Attorney, Agent, or Firm*—Staas & Halsey LLP

(57) ABSTRACT

A handwritten character pattern is input, a coordinate of a rightmost end or a lowermost end of the input handwritten character pattern is detected, a predetermined interval value is added to the coordinate to calculate a coordinate of a position for displaying a blank guide, and the blank guide is displayed in the same display area as that of the handwritten character pattern. In the case where a new handwritten character pattern is input in an area present on the side of the handwritten character pattern from the blank guide, it is recognized that a blank character is not present in a region on the side of the handwritten character pattern from the blank guide. In the case where a new handwritten character pattern is input in an area on the right side or the lower side from the blank guide, it is recognized that a blank character is input in an area on the handwritten character pattern from the blank guide.

20 Claims, 5 Drawing Sheets

HANDWRITTEN CHARACTER INPUT ASSISTANT APPARATUS AND METHOD

BACKGROUND OF THE INVENTION

1. Field of the Invention

The present invention relates to a handwritten character input assistant apparatus that ensures and facilitates a blank input when a character string is input by handwritten character pattern recognition in a handwritten character input apparatus that has an input medium of a handwritten character pattern such as a pen-input tablet as in a personal digital assistant (PDA) and does not have an input frame for each character, and a handwritten character input assistant method therefor.

2. Description of the Related Art

Along with the enhancement of a processing speed of a CPU (Central Processing Unit) due to the recent rapid advancement of a computer-related technique, and the like, even in portable computers such as a palmtop computer and a PDA (Personal Digital Assistant), applications capable of recognizing a character pattern input as a handwritten character have become commonplace.

As a method for recognizing a handwritten character pattern, various methods are considered. However, unlike the case of inputting text data through an input medium such as a keyboard, a problem remains unsolved as to how to handle a blank character.

According to the conventional method for recognizing a handwritten character pattern, a blank character is input as follows: first, a special blank symbol is set, a user inputs the special blank symbol as one handwritten character at a position where the user desires to input a blank character, and the special blank symbol is recognized as a blank character at a time of recognition of a handwritten character pattern.

There is also another method in which a blank button for inputting a blank character is set on a keyboard or a screen, and a user inputs a blank character by pressing the blank button at a position where the user desires to input a blank character.

However, according to the method for inserting a special blank symbol, a user is required to input the blank symbol by handwriting, which puts a burden on the user. Alternatively, in the case where a blank symbol is erroneously recognized, it is required to make a correction to erroneous recognition in the same way as in an ordinary handwritten character.

Furthermore, according to the method using a blank button, a user is required to detach a pen-input tablet from a handwritten character input area and press a blank button. This hinders the operation flow of inputting a handwritten character, making a user interface difficult to handle by a user.

In order to solve the above-mentioned problems, a method is considered in which the presence of a blank character is presumed statistically based on the interval of respective characters in a handwritten character pattern input by a user. According to this method, a user intentionally widens the interval between respective handwritten characters at a position where the user desires to input a blank character, whereby the interval between the handwritten characters is recognized as a blank character when the interval is larger than that determined under predetermined conditions at a time of recognition of a handwritten character pattern.

For example, in JP 5(1993)-67237 A, the length of a blank area between handwritten characters in a character string direction is detected, and an appropriate blank character interval is presumed on the line basis, whereby a blank character is inserted in a blank area between handwritten characters having a length in a character string direction larger than a presumed blank character interval.

Furthermore, JP 6(1994)-51900 A discloses a method for detecting the lengths of blank areas between handwritten characters in a character string direction, dividing the detected lengths of the blank areas by a predetermined constant, and inserting blank characters by the number of the obtained quotient.

However, according the above-mentioned method for presuming the presence of a blank character based on the interval of respective characters, determination of what degree of character interval should be recognized as a blank character is minutely varied among users who input handwritten characters. Therefore, there is a possibility that user's feelings may not be matched with the actual recognition.

For example, according to the method disclosed by JP 5(1993)-67237 A, there is no guarantee that the blank character interval presumed on the line basis is matched with that based on user's feelings. Alternatively, according to the method disclosed by JP 6(1994)-51900 A, there is no guarantee that the blank character interval determined by a predetermined constant for division is matched with the blank character interval recognized by a user.

Accordingly, there is a possibility that a blank character is input at a position where a user recognizes as an area for not inputting a blank character, or a blank character is not input at a position where a user desires to input a blank character.

SUMMARY OF THE INVENTION

Therefore, with the foregoing in mind, it is an object of the present invention to provide a handwritten character input assistant apparatus capable of inputting a blank character by an easy and simple procedure without departing from the feelings of a user who attempts to input a blank character, and a handwritten character input assistant method therefor.

In order to achieve the above-mentioned object, a handwritten character input assistant apparatus of the present invention includes in a handwritten character input apparatus having no input frame for each character: a handwritten character pattern end coordinate detecting part for detecting a coordinate of a rightmost end of an input handwritten character pattern in a case of a horizontal line orientation and a coordinate of a lowermost end of the handwritten character pattern in a vertical line orientation; a blank guide display coordinate calculating part for adding a predetermined interval value to the coordinate to calculate a coordinate of a position for displaying a blank guide; a blank guide display part for displaying the blank guide in the same display area as that of the handwritten character pattern; and a blank character recognizing part for, in a case where a new handwritten character pattern is input in a blank area present on a side of the handwritten character pattern from the blank guide, recognizing that a blank character is not present in the blank area present on the side of the handwritten character pattern from the blank guide, and in a case where the new handwritten character pattern is input on a right side or a lower side from the blank guide, recognizing that a blank character is input in the blank area present on the side of the handwritten character pattern from the blank guide.

According to the above configuration, since a blank guide is shown, a user can input a character in the same way as in the ordinary handwritten character input while always paying attention to whether or not a blank character should be input. This prevents erroneous recognition of a blank character, and enables a blank character to be input without hindering a flow of an operation of inputting a handwritten character.

Herein, the "blank guide" refers to a critical line for determining that a blank character is input between a handwritten character that has already been written and a subsequent handwritten character in a handwritten character input area, in a case where the subsequent handwritten character is input at a position away from the handwritten character that has already been input with respect to the position of the blank guide.

Furthermore, in a handwritten character input assistant apparatus of the present invention, it is preferable that, in a case where the blank guides are displayed in a plural number by adding a predetermined interval value to the coordinate, and a new handwritten character pattern is input in an area on a right side from any of the blank guides in a case of a horizontal line orientation and in an area on a lower side from any of the blank guides in a case of a vertical line orientation, the blank character recognizing part recognizes that the blank characters are input in the blank area by the number of the blank guides displayed in the blank area present on the side of the handwritten character pattern from any of the blank guides. This configuration enables a plurality of blank characters to be input continuously.

Furthermore, in a handwritten character input assistant apparatus of the present invention, it is preferable that the blank guide display part further includes a blank guide display interval altering part capable of altering the predetermined interval value. This is because user's feelings about an interval corresponding to a blank character can be matched with an interval corresponding to a blank character displayed by a blank guide.

Furthermore, the present invention is directed to a handwritten character input assistant method including: detecting a coordinate of a rightmost end of an input handwritten character pattern in a case of a horizontal line orientation and a coordinate of a lowermost end of the handwritten character pattern in a case of a vertical line orientation; adding a predetermined interval value to the coordinate to calculate a coordinate of a position for displaying a blank guide; displaying the blank guide in the same display area as that of the handwritten character pattern; and recognizing that a blank character is not present in a blank area present on a side of the handwritten character pattern from the blank guide, in a case where a new handwritten character pattern is input in the blank area present on the side of the handwritten character pattern from the blank guide, and recognizing that the blank character is input in the blank area present on the handwritten character pattern from the blank guide, in a case where the new handwritten character pattern is input on a right side or a lower side from the blank guide, and a computer-executable program containing software for executing the function of the above-mentioned handwritten character input assistant apparatus as processes of a computer.

Because of the above configuration, when the program is loaded onto a computer for execution, a blank guide is displayed, so that a user can input a character in the same way as in the ordinary handwritten character input while always paying attention to whether or not a blank character should be input. Accordingly, a handwritten character input assistant apparatus is realized, which prevents erroneous recognition of a blank character, and enables a blank character to be input without hindering a flow of an operation of inputting a handwritten character.

These and other advantages of the present invention will become apparent to those skilled in the art upon reading and understanding the following detailed description with reference to the accompanying figures.

DESCRIPTION OF THE PREFERRED EMBODIMENTS

Figure 1:
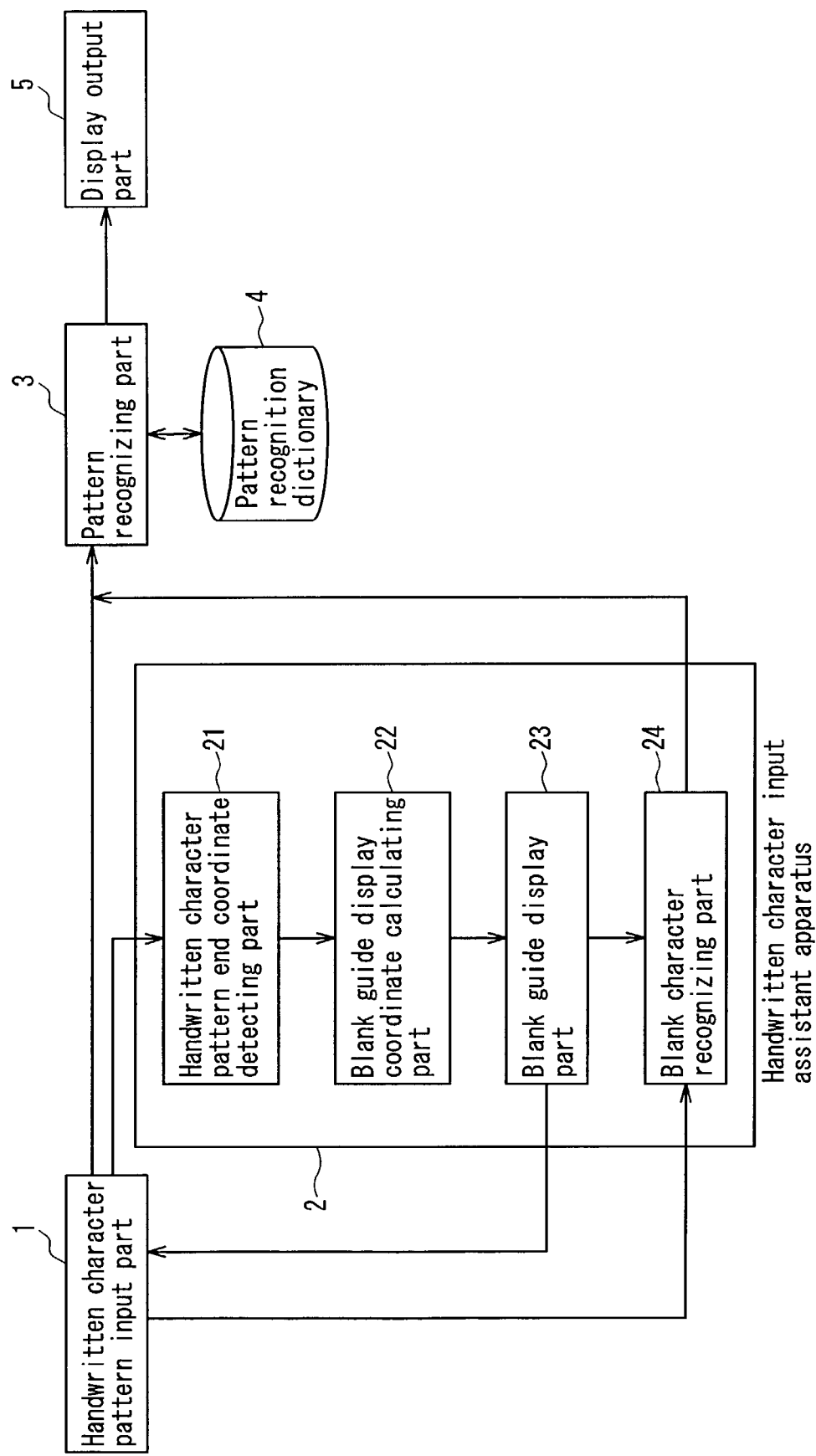
FIG. 1 is a view showing a configuration of a handwritten character input apparatus including a handwritten character input assistant apparatus of an embodiment according to the present invention.

Hereinafter, a handwritten character input assistant apparatus of an embodiment according to the present invention will be described with reference to the drawings. FIG. 1 is a view showing a configuration of a handwritten character input apparatus using the handwritten character input assistant apparatus of the embodiment according to the present invention. In the present embodiment, although it is assumed that handwritten characters are arranged in a horizontal line orientation, the same processing also applies to a vertical line orientation.

First, referring to FIG. 1, reference numeral 1 denotes a handwritten character pattern input part. In the present embodiment, a pen-input tablet or the like is assumed. It should be understood that the present invention is not limited thereto, and any input medium capable of inputting handwritten characters may be used.

Furthermore, an input frame is provided for keeping the vertical interval (in the case of a horizontal line orientation) and the horizontal interval (in the case of a vertical line orientation) to be constant. This enables the size of each character pattern to be uniform, contributing to the enhancement of a recognition precision.

Reference numeral 2 denotes a handwritten character input assistant apparatus of the embodiment according to the present invention. The handwritten character input assistant apparatus 2 includes a handwritten character pattern end coordinate detecting part 21, a blank guide display coordinate calculating part 22, a blank guide display part 23, and a blank character recognizing part 24.

First, the handwritten character pattern end coordinate detecting part 21 obtains, as a coordinate, the position of the right end (lower end in the case of a vertical line orientation) of an input handwritten character pattern. Assuming that such a coordinate axis is an X-axis, the coordinate of an origin of the X-axis is set at the left end of a handwritten character input area. Therefore, before the handwritten character pattern is input, X=0 is obtained as an X-coordinate.

Then, the blank guide display coordinate calculating pattern 22 multiplies the width of the handwritten character input area by a predetermined coefficient, and adds the product thus obtained to the coordinate obtained in the handwritten character pattern end coordinate detecting part 21, thereby obtaining a coordinate displaying a blank guide.

Figure 2:
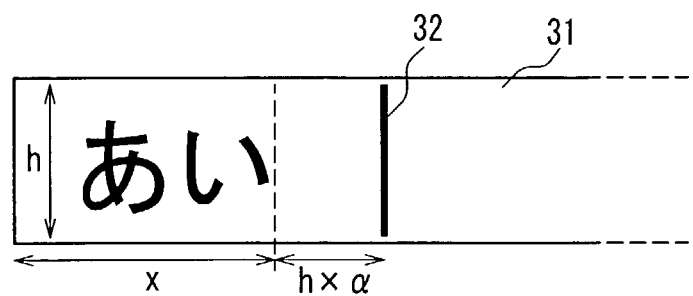
FIG. 2 illustrates a blank guide line in the handwritten character input assistant apparatus of an embodiment according to the present invention.

For example, in the case of a horizontal line orientation, the width of a handwritten character input area 31 as shown in FIG. 2 corresponds to a limit value "h" of a character height. A product (h×α) obtained by multiplying the limit value "h" by a predetermined coefficient "α" represents a character interval as a critical value for recognizing a blank character. It is considered that the coefficient "α" usually has a value of about 1; however, the coefficient is not limited thereto.

Accordingly, the coordinate displaying a blank guide 32 is presented as a value calculated by adding the character interval (h×α) to the coordinate of the right end of the handwritten character pattern obtained in the handwritten character pattern end coordinate detecting part 21. Assuming that the obtained coordinate of the right end of the handwritten character pattern is X=x, a blank guide display coordinate "Xw" to be obtained becomes equal to x+(h×α).

The blank guide display part 23 displays a guide line, representing what degree of a character interval is considered as a blank, at a coordinate obtained in the blank guide display coordinate calculating part 22. A user can recognize the presence a blank character with reference to a displayed blank guide. That is, when the user starts writing a subsequent handwritten character from the left side of the blank guide (i.e., from the position closer to a handwritten character that has already been written), the presence of a blank character is not recognized. On the other hand, when the user starts writing a subsequent handwritten character from the right side of the blank guide (i.e., from the position farther from the handwritten character that has already been written), the presence of a blank character is recognized.

As shown in FIG. 2, the blank guide 32 is not limited to a solid line. It should be appreciated that lines of any type, thickness, display density and the like may be used.

When a subsequent handwritten character pattern is input through the handwritten character pattern input part 1, the blank character recognizing part 24 compares the coordinate at which the left end of the newly input handwritten character pattern is placed with the blank guide display coordinate. If the coordinate at which the left end of the newly input handwritten character pattern is placed is smaller than the blank guide display coordinate, the presence of a blank character is not recognized. If the coordinate at which the left end of the newly input handwritten character pattern is placed is larger than the blank guide display coordinate, the presence of a blank character is recognized.

A handwritten character pattern recognizing part 3 recognizes the other characters, which have not been recognized as blank characters, as an entire input character string by a general recognition method (e.g., a method for confirming each recognition character on the pattern basis with reference to a pattern recognition dictionary 4). A display output part 5 displays a recognition result on a screen. There is no particular limit to a method of display output.

It is also considered that a character interval to be recognized as a blank character represented by a blank guide is varied in accordance with user's feelings. That is, the value of the predetermined coefficient "α" is varied.

More specifically, the case of adopting a pen-input tablet as the handwriting character pattern input part 1 will be described. First, in an initial state, a user has not put down a pen point of a pen-input tablet to a handwritten character input area (standby state for handwritten character pattern input). In an initial standby state, a blank guide is displayed at a coordinate position (h×α) because of X=0.

Figure 3:
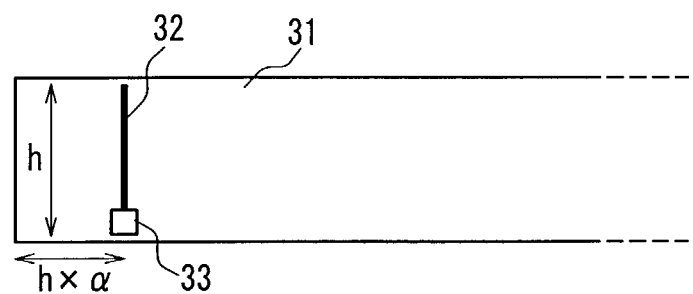
FIG. 3 illustrates a blank guide adjustment button in the handwritten character input assistant apparatus of an embodiment according to the present invention.

Next, as shown in FIG. 3, when the pen point is put down to the handwritten character input area 31, a standby state is cancelled, and the coordinate position indicated by the pen point can be detected. Then, it is confirmed whether or not the coordinate position indicated by the pen point is on a blank guide regulation button 33.

In the case where the coordinate position indicated by the pen point is on the blank guide regulation button 33, a character interval (h×α) in a blank guide display is updated so as to follow the movement of the pen point until the pen point is detached. At the same time, a display of the blank guide regulation button 33 is updated. When the pen point is detached from the handwritten character input area 31, the display position of the blank guide is updated in accordance with the updated character interval (h×α). More specifically, the initial display of the blank guide is erased, and the blank guide is displayed at a new position. Thereafter, the process returns to the initial standby state.

In the case where the coordinate position indicated by the pen point is not on the blank guide regulation button 33, such an input is determined as an ordinary handwritten character input. Then, until the pen point is detached again, the coordinate position indicated by the pen point is continued to be obtained, and a trail (handwriting) laid down by the coordinate position indicated by the pen point is displayed in echo back.

Next, when the pen point is detached from the handwritten character input area, it is determined whether or not the left end of the input handwritten character (handwriting) is placed on the left side of the coordinate position for displaying the blank guide.

In the case where the left end of the input handwritten character (handwriting) is not on the left side of the coordinate position for displaying the blank guide, a "blank mark" showing the recognition of a blank character is displayed. Thereafter, the coordinate position representing the right end of the entire handwriting is updated to a coordinate position representing the right end of the newly input handwritten character, whereby the coordinate position for displaying the blank guide is moved.

Figure 4:
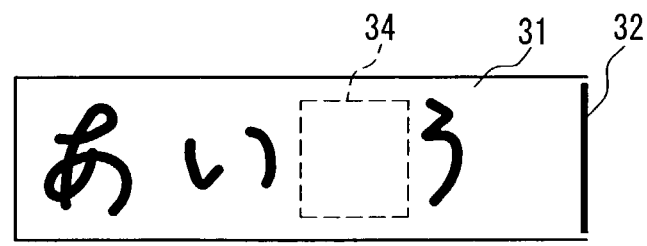
FIG. 4 illustrates a blank mark in the handwritten character input assistant apparatus of an embodiment according to the present invention.

FIG. 4 shows a display example of a blank mark. In the example shown in FIG. 4, a rectangle represented by a broken line is displayed as a blank mark 34 in a portion where a blank character is input. Needless to say, the display form of the blank mark 34 is not limited to the above. Any display form may be used as long as the presence of a blank character in a corresponding portion can be recognized.

On the other hand, in the case where the left end of the input handwritten character (handwriting) is placed on the left side of the coordinate position for displaying the blank guide, it is checked whether or not a portion where the blank mark has been displayed should be cancelled as a result of the last handwritten character input. More specifically, the input handwritten character may narrow the interval of the handwritten characters, so that it is checked if the character interval is enough for recognizing a blank character. If it is determined that there is a blank mark to be cancelled, i.e., if it is determined that the character interval is not enough for recognizing a blank character, the display of the blank mark is deleted. Furthermore, even in any determination, the coordinate position representing the right end of the entire handwritten character pattern that has already been input is updated to the coordinate position representing the right end of the newly input handwritten character pattern, whereby the coordinate position displaying the blank guide is moved.

Furthermore, in the case of recognizing a handwritten character, an interval to be recognized as a blank character is always shown clearly when a user inputs a handwritten character pattern. Therefore, an unintended blank character is not to be recognized, and a blank character can be input without a special operation.

Figure 5:
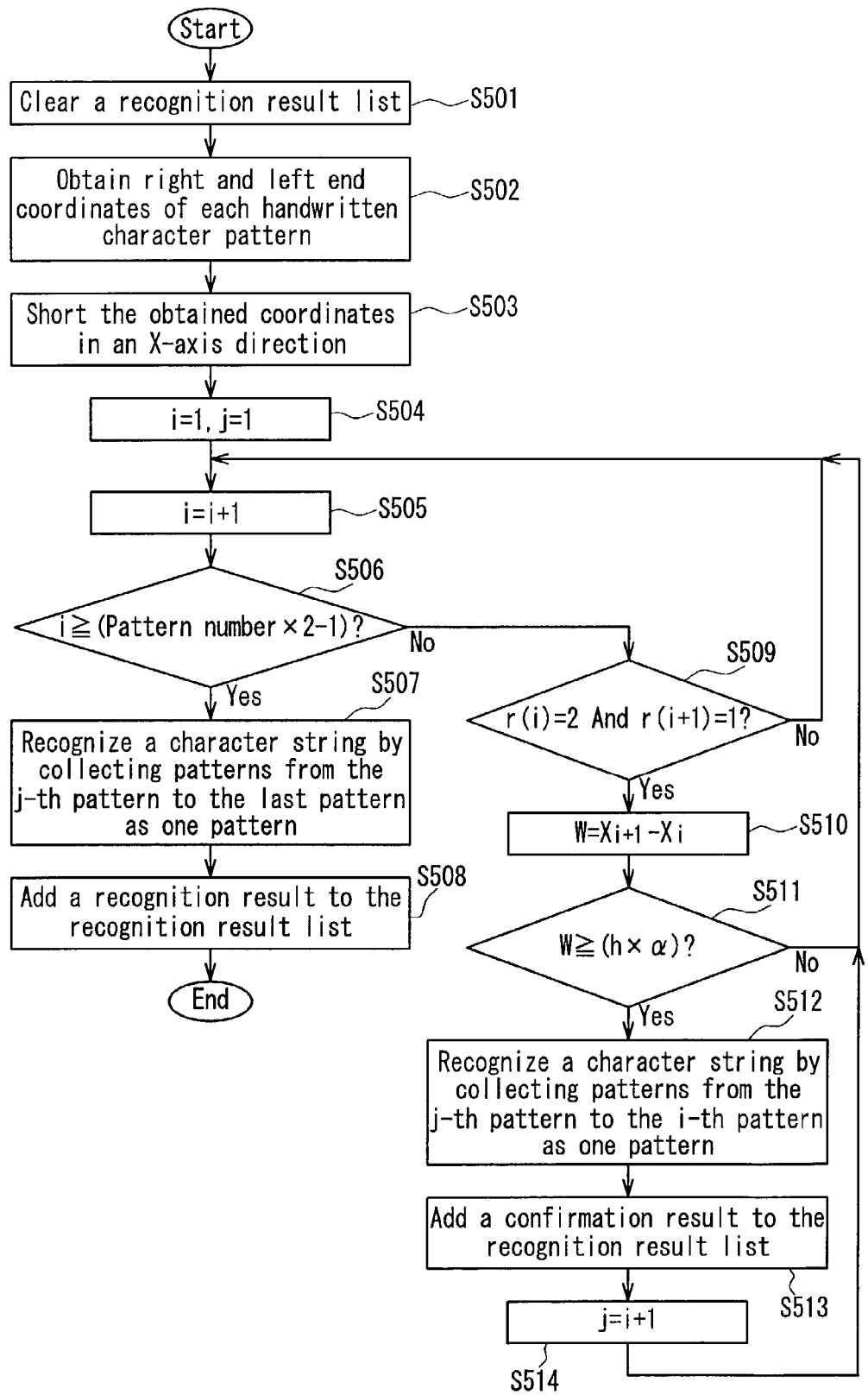
FIG. 5 is a flow chart illustrating handwritten character recognition processing in the handwritten character input assistant apparatus of an embodiment according to the present invention.

FIG. 5 shows a flow of recognition processing of a handwritten character. In FIG. 5, a recognition result list is cleared in initialization processing (Operation 501). Then, X-axis coordinates (Y-axis coordinates in the case of a vertical line orientation) of the right end and the left end (upper end and lower end in the case of a vertical line orientation) are obtained with respect to each input handwritten character pattern (Operation 502).

Then, a list of coordinate positions is sorted (Operation 503). Herein, it is assumed that an i-th pattern in the input handwritten character pattern is $S_i$, a k-th value in the coordinate position list after sorting is $x_k$, a pattern number corresponding to the value $x_k$ is t(k), and the pattern corresponding to a pattern number is $S_{t(k)}$. When $x_k$ refers to the left end of the pattern, r(k)=1 is defined. When $x_k$ refers to the right end of the pattern, r(k)=2 is defined. After sorting the entire list, "1" is stored in the work variables "i" and "j", respectively (Operation 504).

Next, after the value of the work variable "i" is increased by "1" (Operation 505), it is determined whether or not the work variable "i" becomes equal to or more than (pattern number ×2−1) (Operation 506). In the case where the work variable "i" is equal to or more than (pattern number ×2−1) (Operation 506: Yes), a character string is recognized by collecting patterns from a j-th pattern to the last pattern (i.e., $S_{t(j)}, S_{t(j+1)}, \ldots, S_{t(n-1)}, S_{t(n)}$) as one pattern (Operation 507). A result is added to the recognition result list (Operation 508). Herein, "n" represents (pattern number ×2.). Thereafter, the contents of the recognition result list are considered as a final recognition result, whereby the processing is completed.

In the case where the work variable "i" is not equal to or more than (pattern number ×2−1) (Operation 506: No), it is determined whether or not r(i)=2 and r(i+1)=1 are satisfied (Operation 509). In the case where r(i)=2 and r(i+1)=1 are not satisfied (Operation 509: No), the value of the work variable "i" is increased by "1" (Operation 505), and thereafter, it is determined whether or not the work variable "i" becomes equal to or more than (pattern number ×2−1) (Operation 506). Thus, the above processing is repeated.

On the other hand, in the case where r(i)=2 and r(i+1)=1 are satisfied (Operation 509: Yes), $(x_{i+1}-x_i)$ is obtained, and the result is stored in the work variable W (Operation 510). Thereafter, (h×α) that is a relative interval for determining a blank guide display coordinate is compared with the value of W (Operation 511).

In the case where W≧(h×α) (Operation 511: Yes), a character string is recognized with $S_{t(j)}, S_{t(j+1)}, \ldots, S_{t(i-1)}, S_{t(i)}$ being as one pattern (Operation 512), and the recognition result is added to the recognition result list (Operation 513). In the case where W≧(h×α) (Operation 511: Yes), the presence of a blank character can be recognized, so that the blank character is also added to the recognition result list (Operation 514). Then, (i+1) is stored in "j" (Operation 515), and the value of the work variable "i" is increased by "1" (Operation 505). Thereafter, it is determined whether or not the work variable "i" is equal to or more than (pattern number ×2−1) (Operation 506). Thus, the above processing is repeated.

In the case where W<(h×α) (Operation 511: No), the work variable "i" is increased by "1" (Operation 505), and thereafter, it is determined whether or not the work variable "i" is equal to or more than (pattern number ×2−1) (Operation 506). Thus, the above processing is repeated.

More specifically, an interval of adjacent patterns is obtained by sorting patterns in an X-axis direction. A character string pattern is divided at a position where the interval is equal to or more than a predetermined value (h×α) to generate sub-patterns. Results obtained by recognizing character strings on the sub-pattern basis are connected with blank characters interposed therein to obtain a final character recognition result.

The above-mentioned determination of whether or not the "blank mark" should be erased can also be conducted by the above processing of determining whether or not each pattern interval is equal to or more than a predetermined value. According to the above processing, even after a user has performed edits such as deletion and movement of a partial pattern, it is possible to discriminate a portion where a blank mark should be displayed from a portion where a blank mark should not be displayed.

Even while a user is moving a partial pattern, the display of a blank guide is effective. In this case, a blank guide is displayed at a position away from the right end of the pattern other than the portions to be moved, at a predetermined distance (h×α) in the right direction.

A blank guide is not limited to one. For example, a plurality of blank guides may be displayed. In this case, when a new handwritten character is input, it is detected how many blank guides are displayed on the left side of the coordinate position representing the left end of the newly input handwritten character pattern, and it is recognized that blank characters are inserted by the detected number.

Figure 6:
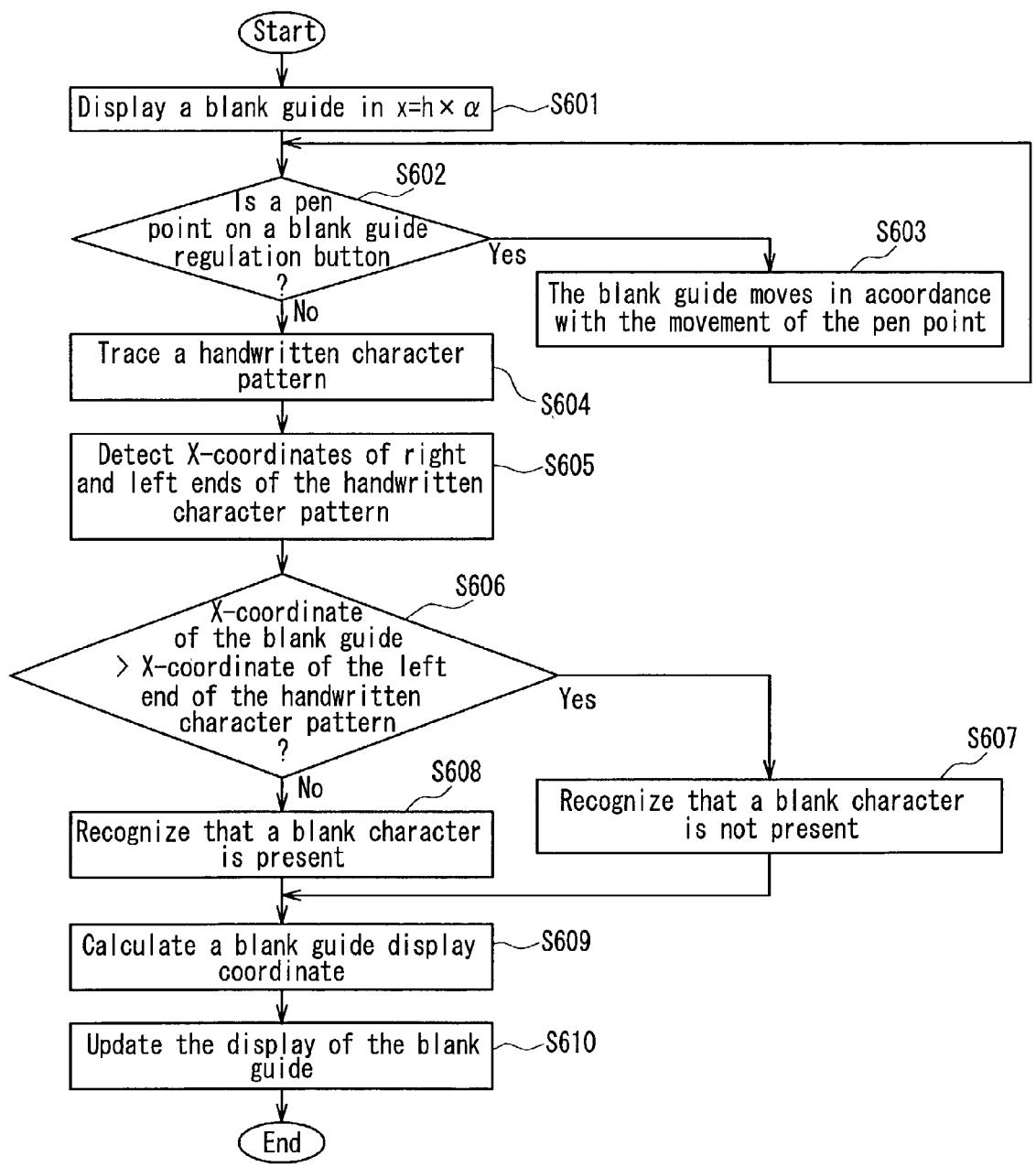
FIG. 6 is a flow chart illustrating processing in the handwritten character input assistant apparatus of an embodiment according to the present invention.

Next, a processing flow of a program for realizing a handwritten character input assistant apparatus of an embodiment according to the present invention will be described. FIG. 6 is a flow chart illustrating the processing of a program for realizing the handwritten character input assistant apparatus of the embodiment according to the present invention.

In FIG. 6, a blank guide is displayed at a position of an X-coordinate X=h×α in the handwritten character input area 31 (Operation 601). When the pen point of a pen-input tablet is put down to the hand-written character input area 31, it is determined whether or not the pen point is positioned on the blank guide regulation button 33 (Operation 602).

In the case where the pen point is positioned on the blank guide regulation button 33 (Operation 602: Yes), the blank guide 32 is moved to the X-coordinate indicated by the pen point until the pen point is detached from the handwritten character input area 31 (Operation 603).

In the case where the pen point is not positioned on the blank guide regulation button 33 (Operation 602: No), the handwritten character pattern starts being traced (Operation 604). When the pen point is detached from the character input area 31, i.e., when an input of the handwritten character pattern is suspended, X-coordinates of the right and left ends of the input handwritten character pattern are detected (Operation 605).

Next, the X-coordinate of the displayed blank guide is compared with the X-coordinate of the detected left end of the handwritten character pattern (Operation 606). If the X-coordinate of the blank guide is larger (Operation 606: Yes), it is recognized that there is no blank character (Operation 607). If the X-coordinate of the blank guide is smaller (Operation 606: No), it is recognized that a blank character is inserted (Operation 608).

In order to recognize the input handwritten character pattern, the handwritten character pattern is transferred to the pattern recognizing part 3. The blank guide display coordinate is calculated by adding (h×α) to the X-coordinate of the detected right end of the handwritten character pattern (Operation 609). The currently displayed blank guide is erased, and a blank guide is displayed at a calculated new coordinate position (Operation 610).

As described above, according to the present embodiment, since a blank guide is shown, a user can input a character in the same way as in the ordinary handwritten character input while always paying attention to whether or not a blank character should be input. This prevents erroneous recognition of a blank character, and enables a blank character to be input without hindering a flow of an operation of inputting a handwritten character.

Furthermore, user's feelings about an interval corresponding to a blank character can be matched with an interval corresponding to a blank character displayed by a blank guide. Therefore, erroneous recognition regarding a blank character can be prevented exactly.

Figure 7:
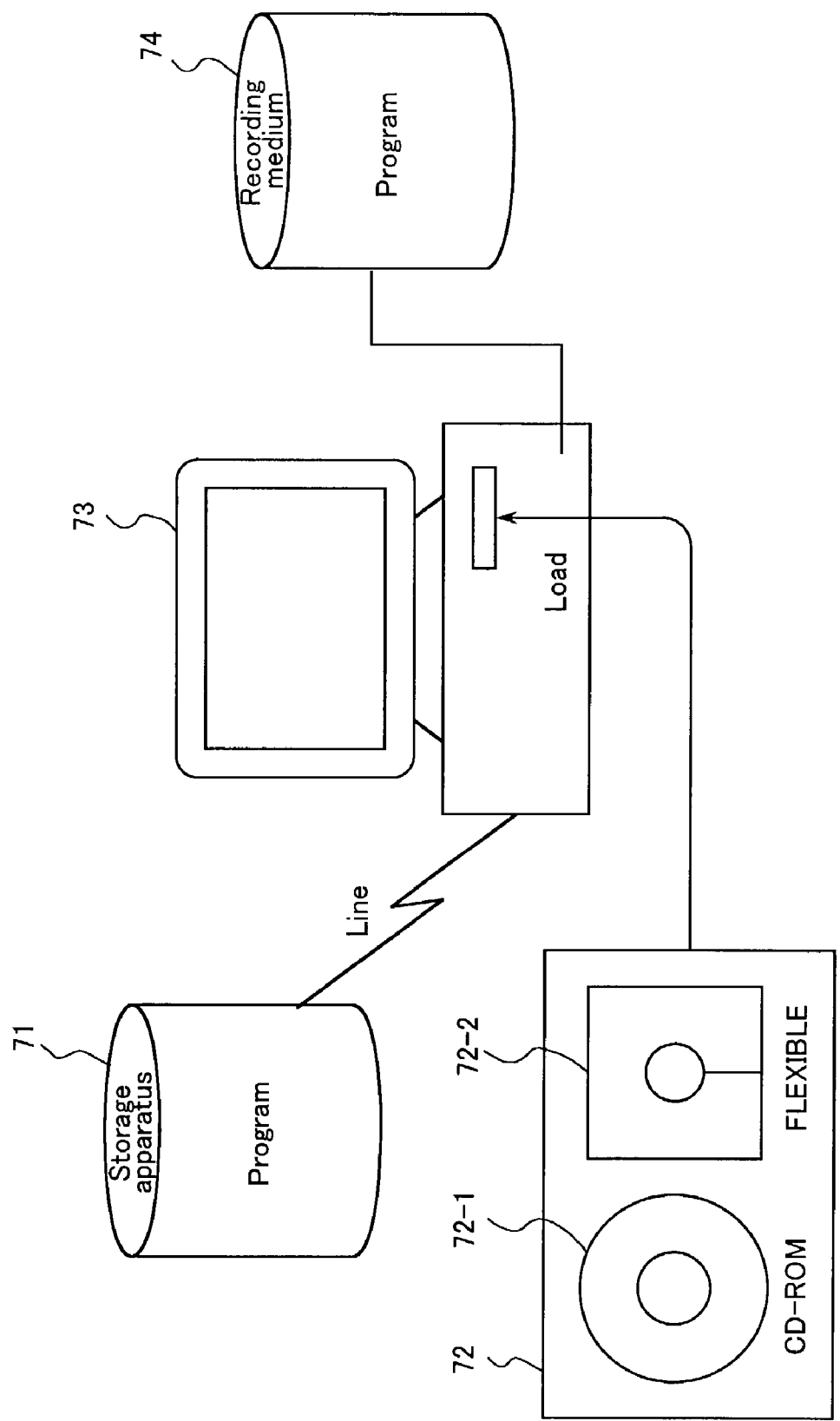
FIG. 7 illustrates a computer environment.

A program for realizing the handwritten character input assistant apparatus of the embodiment according to the present invention may be stored not only in a portable recording medium 72 such as a CD-ROM 72-1 and a flexible disk 72-2, but also in a storage apparatus 71 provided at the end of a communication line and a recording medium 74 such as a hard disk and a RAM of a computer 73, as shown in FIG. 7. During execution, the program is loaded, and executed on a main memory.

Furthermore, a blank guide display coordinate and the like generated by the handwritten character input assistant apparatus of the embodiment according to the present invention may also be stored not only in a portable recording medium 72 such as a CD-ROM 72-1 and a flexible disk 72-2, but also in a storage apparatus 71 provided at the end of a communication line and a recording medium 74 such as a hard disk and a RAM of a computer 73, as shown in FIG. 7. For example, the blank guide display coordinate and the like are read by the computer 73 when the handwritten character input assistant apparatus of the present invention is used.

As described above, according to the handwritten character input assistant apparatus and method of the present invention, since a blank guide is shown, a user can input a character in the same way as in the ordinary handwritten character input while always paying attention to whether or not a blank character should be input. This prevents erroneous recognition of a blank character, and enables a blank character to be input without hindering a flow of an operation of inputting a handwritten character.

Furthermore, according to the handwritten character input assistant apparatus and method of the present invention, user's feelings about an interval corresponding to a blank character can be matched with an interval corresponding to a blank character displayed by a blank guide. Therefore, erroneous recognition regarding a blank character can be prevented exactly.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A handwritten character input assistant apparatus, comprising in a handwritten character input apparatus having no input frame for each character:
    a handwritten character pattern end coordinate detecting part for detecting a coordinate of a rightmost end of an input handwritten character pattern in a case of a horizontal line orientation and a coordinate of a lowermost end of the handwritten character pattern in a vertical line orientation;
    a blank guide display coordinate calculating part for adding a predetermined interval value to the coordinate to calculate a coordinate of a position for displaying a blank guide;
    a blank guide display part for displaying the blank guide in the same display area as that of the handwritten character pattern; and
    a blank character recognizing part for, in a case where a new handwritten character pattern is input in a blank area present on a side of the handwritten character pattern from the blank guide, recognizing that a blank character is not present in the blank area present on the side of the handwritten character pattern from the blank guide, and in a case where the new handwritten character pattern is input on a right side or a lower side from the blank guide, recognizing that a blank character is input in the blank area present on the side of the handwritten character pattern from the blank guide.

2. A handwritten character input assistant apparatus according to claim 1, wherein, in a case where a writing frame partitioned on a line or column basis is provided, the blank guide display part displays the blank guide from a leading end of the line or the column.

3. A handwritten character input assistant apparatus according to claim 1, wherein, in a case where it is determined that the blank character is input in the blank area present on the side of the handwritten character pattern from the blank guide, the blank guide display part displays an indicator indicating that the blank character is input.

4. A handwritten character input assistant apparatus according to claim 2, wherein, in a case where it is determined that the blank character is input in the blank area present on the side of the handwritten character pattern from the blank guide, the blank guide display part displays an indicator indicating that the blank character is input.

5. A handwritten character input assistant apparatus according to claim 1, wherein, in a case where the blank guides are displayed in a plural number by adding a predetermined interval value to the coordinate, and a new handwritten character pattern is input in an area on a right side from any of the blank guides in a case of a horizontal line orientation and in an area on a lower side from any of the blank guides in a case of a vertical line orientation, the blank character recognizing part recognizes that the blank characters are input in the blank area by the number of the blank guides displayed in the blank area present on the side of the handwritten character pattern from any of the blank guides.

6. A handwritten character input assistant apparatus according to claim 2, wherein, in a case where the blank guides are displayed in a plural number by adding a predetermined interval value to the coordinate, and a new handwritten character pattern is input in an area on a right side from any of the blank guides in a case of a horizontal line orientation and in an area on a lower side from any of the blank guides in a case of a vertical line orientation, the blank character recognizing part recognizes that the blank characters are input in the blank area by the number of the blank guides displayed in the blank area present on the side of the handwritten character pattern from any of the blank guides.

7. A handwritten character input assistant apparatus according to claim 3, wherein, in a case where the blank guides are displayed in a plural number by adding a predetermined interval value to the coordinate, and a new handwritten character pattern is input in an area on a right side from any of the blank guides in a case of a horizontal line orientation and in an area on a lower side from any of the blank guides in a case of a vertical line orientation, the blank character recognizing part recognizes that the blank characters are input in the blank area by the number of the blank guides displayed in the blank area present on the side of the handwritten character pattern from any of the blank guides.

8. A handwritten character input assistant apparatus according to claim 4, wherein, in a case where the blank guides are displayed in a plural number by adding a predetermined interval value to the coordinate, and a new handwritten character pattern is input in an area on a right side from any of the blank guides in a case of a horizontal line orientation and in an area on a lower side from any of the blank guides in a case of a vertical line orientation, the blank character recognizing part recognizes that the blank characters are input in the blank area by the number of the blank guides displayed in the blank area present on the side of the handwritten character pattern from any of the blank guides.

9. A handwritten character input assistant apparatus according to claim 1, wherein the predetermined interval value is obtained by multiplying a line width or a column width for inputting the handwritten character pattern by a predetermined constant.

10. A handwritten character input assistant apparatus according to claim 2, wherein the predetermined interval value is obtained by multiplying a line width or a column width for inputting the handwritten character pattern by a predetermined constant.

11. A handwritten character input assistant apparatus according to claim 3, wherein the predetermined interval value is obtained by multiplying a line width or a column width for inputting the handwritten character pattern by a predetermined constant.

12. A handwritten character input assistant apparatus according to claim 4, wherein the predetermined interval value is obtained by multiplying a line width or a column width for inputting the handwritten character pattern by a predetermined constant.

13. A handwritten character input assistant apparatus according to claim 5, wherein the predetermined interval value is obtained by multiplying a line width or a column width for inputting the handwritten character pattern by a predetermined constant.

14. A handwritten character input assistant apparatus according to claim 7, wherein the predetermined interval value is obtained by multiplying a line width or a column width for inputting the handwritten character pattern by a predetermined constant.

15. A handwritten character input assistant apparatus according to claim 1, wherein the blank guide display part further comprises a blank guide display interval altering part capable of altering the predetermined interval value.

16. A handwritten character input assistant apparatus according to claim 2, wherein the blank guide display part further comprises a blank guide display interval altering part capable of altering the predetermined interval value.

17. A handwritten character input assistant apparatus according to claim 3, wherein the blank guide display part further comprises a blank guide display interval altering part capable of altering the predetermined interval value.

18. A handwritten character input assistant apparatus according to claim 5, wherein the blank guide display part further comprises a blank guide display interval altering part capable of altering the predetermined interval value.

19. A handwritten character input assistant method having no input frame for each character, comprising:
   detecting a coordinate of a rightmost end of an input handwritten character pattern in a case of a horizontal line orientation and a coordinate of a lowermost end of the handwritten character pattern in a case of a vertical line orientation;
   adding a predetermined interval value to the coordinate to calculate a coordinate of a position for displaying a blank guide;
   displaying the blank guide in the same display area as that of the handwritten character pattern; and
   recognizing that a blank character is not present in a blank area present on a side of the handwritten character pattern from the blank guide, in a case where a new handwritten character pattern is input in the blank area present on the side of the handwritten character pattern from the blank guide, and recognizing that the blank character is input in the blank area present on the handwritten character pattern from the blank guide, in a case where the new handwritten character pattern is input on a right side or a lower side from the blank guide.

20. A medium storing a computer-executable program for realizing a handwritten character input method having no input frame for each character, the program comprising:
   detecting a coordinate of a rightmost end of an input handwritten character pattern in a case of a horizontal line orientation and a coordinate of a lowermost end of the handwritten character pattern in a case of a vertical line orientation;
   adding a predetermined interval value to the coordinate to calculate a coordinate of a position for displaying a blank guide;
   displaying the blank guide in the same display area as that of the handwritten character pattern; and
   recognizing that a blank character is not present in a blank area present on a side of the handwritten character pattern from the blank guide, in a case where a new handwritten character pattern is input in the blank area present on the side of the handwritten character pattern from the blank guide, and recognizing that the blank character is input in the blank area present on the handwritten character pattern from the blank guide, in a case where the new handwritten character pattern is input on a right side or a lower side from the blank guide.

* * * * *